(12) United States Patent
Bornea et al.

(10) Patent No.: US 9,037,615 B2
(45) Date of Patent: May 19, 2015

(54) QUERYING AND INTEGRATING STRUCTURED AND UNSTRUCTURED DATA

(75) Inventors: Mihaela Ancuta Bornea, White Plains, NY (US); Songyun Duan, Pleasantville, NY (US); James J. Fan, Mountain Lakes, NY (US); Achille Fokoue-Nkoutche, White Plains, NY (US); Alfio M. Gliozzo, New York, NY (US); Aditya Kalyanpur, Westwood, NJ (US); Anastasios Kementsietsidis, New York, NY (US); Kavitha Srinivas, Rye, NY (US); Michael J. Ward, New Haven, CT (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 13/493,174

(22) Filed: Jun. 11, 2012

(65) Prior Publication Data

US 2013/0332478 A1 Dec. 12, 2013

(51) Int. Cl.
*G06F 7/00* (2006.01)
*G06F 17/30* (2006.01)

(52) U.S. Cl.
CPC .... *G06F 17/30946* (2013.01); *G06F 17/30292* (2013.01)

(58) Field of Classification Search
USPC ........................................................ 707/705
See application file for complete search history.

(56) References Cited

U.S. PATENT DOCUMENTS

| | | | |
|---|---|---|---|
| 6,038,566 A * | 3/2000 | Tsai | 1/1 |
| 6,772,180 B1 | 8/2004 | Li et al. | |
| 6,826,568 B2 | 11/2004 | Bernstein et al. | |
| 7,225,183 B2 | 5/2007 | Gardner | |
| 7,472,137 B2 | 12/2008 | Edelstein et al. | |
| 7,475,084 B2 | 1/2009 | Edelstein et al. | |
| 7,480,640 B1 | 1/2009 | Elad et al. | |
| 7,673,282 B2 | 3/2010 | Amaru et al. | |

(Continued)

FOREIGN PATENT DOCUMENTS

| | | |
|---|---|---|
| WO | 2009103776 A2 | 8/2009 |
| WO | WO-2011110809 A1 | 9/2011 |
| WO | WO-2011126995 A1 | 10/2011 |

OTHER PUBLICATIONS

Hristidis, et al., "Discover: Keyword search in relational databases," VLDB, 2002.

(Continued)

*Primary Examiner* — Jason Liao
(74) *Attorney, Agent, or Firm* — Cantor Colburn LLP

(57) ABSTRACT

A computer-implemented method, system, and article of manufacture for querying and integrating structured and unstructured data. The method includes: receiving entity information that is extracted from a first set of unstructured data using an open domain information extraction system, wherein the entity in-formation comprises relationship information between a first entity and a second entity of the first set of unstructured data; recognizing a pattern based on the relationship information and creating a schema for the first set of unstructured data based on the pattern; and associating an element of the created schema with (i) an entity of a second set of unstructured data or (ii) a schema element of an existing set of structured data if there is sufficient overall similarity between the created schema element and either the second unstructured data entity or the schema element of the existing structured data.

19 Claims, 11 Drawing Sheets

(56) References Cited

U.S. PATENT DOCUMENTS

| | | | |
|---|---|---|---|
| 8,355,905 | B2 | 1/2013 | Fokoue-Nkoutche et al. |
| 8,370,359 | B2 | 2/2013 | Byrne et al. |
| 2003/0174859 | A1 | 9/2003 | Kim |
| 2003/0177112 | A1* | 9/2003 | Gardner .............................. 707/3 |
| 2004/0117346 | A1 | 6/2004 | Stoffel et al. |
| 2004/0260576 | A1 | 12/2004 | Wang et al. |
| 2005/0091076 | A1 | 4/2005 | McGovern |
| 2007/0150424 | A1 | 6/2007 | Igelnik |
| 2007/0150495 | A1 | 6/2007 | Koizumi et al. |
| 2007/0198448 | A1 | 8/2007 | Fokoue-Nkoutche et al. |
| 2008/0065578 | A1 | 3/2008 | Fokoue-Nkoutche et al. |
| 2008/0071731 | A1 | 3/2008 | Ma et al. |
| 2008/0077570 | A1* | 3/2008 | Tang et al. ......................... 707/5 |
| 2009/0100090 | A1 | 4/2009 | Lee et al. |
| 2010/0049766 | A1 | 2/2010 | Sweeney et al. |
| 2011/0106807 | A1* | 5/2011 | Srihari et al. .................. 707/739 |
| 2011/0246535 | A1* | 10/2011 | Freeman et al. .............. 707/803 |
| 2013/0006968 | A1* | 1/2013 | Gusmini et al. .............. 707/722 |

OTHER PUBLICATIONS

Agrawal, et al., "DBXplorer: A system for keyword-based search over relational databases," ICDE, 2002.

Hristidis, et al., "Keyword proximity search on XML graphs," ICDE, 2003.

Bhalotia, et al., "Keyword searching and browsing in databases using Banks," ICDE, 2002.

Xu, et al., "Efficient keyword search for smallest LCAs in XML databases," Sigmod, 2005.

Liu, et al., "Answering Structured Queries on Unstructured Data," WebDB, 2006.

Banko, et al., "Open information extraction from the web," IJCAI, 2007.

Fan, et al., "Prismatic: Inducing Knowledge from a Large Scale Lexicalized Relation Resource," Proceedings of the NAACL HLT 2010, First International Workshop on Formalisms and Methodology for Learning by Reading, 2010.

Duan, et al., "One Size Does Not Fit All: Customizing Ontology Alignment Using User Feedback," The Semantic Web—ISWC 2010, vol. 6496/2010, pp. 177-192.

Duan, et al., "A Clustering-based Approach to Ontology Alignment," ISWC'11 Proc. of the 10th int'l conf. on The semantic web—vol. Pt I, 2011, pp. 146-161.

Buneman et al., "Adding Structure to Unstructured Data," In 6th Int. Conf. on Database Theory (ICDT '97),LNCS 1186, 336-350, 1997.

BeliefNetworks, Inc., "Semantically Secure Unstructured Data Classfication," BeliefNetworks, inc. Charleston, South Carolina, Apr. 7, 2010.

Unitas, "A Single View: Integrating Structured and Unstructured data/Information within the Enterprise.", BackWeb ProactivePortal Server White Paper, Jan. 2002.

Maluf et al., "Managing Unstructured Data With Structured Legacy Systems," Aerospace Conference, 2008 IEEE.

Bergamaschi et al.; "A New Type of Metadata for Querying Data Integration Systems"; 15th Italian Symp. on Advanced DB Sys. (SEBD 2007); Jun. 17-20, 2007; pp. 1-8.

Chen et al.; "The Structure and Dynamics of Co-citation Clusters: A Multiple-Perspective Co-citation Analysis", J. of the Amer. Soc. for Info. Sci. & Tech.; Mar. 18, 2010; pp. 1-33.

Choi et al.; "A Clustering Method Based on Path Similarities of XML Data"; Data & Knowledge Eng., vol. 60, Issue 2; Feb. 2007; pp. 361-376.

Giuliano et al.; "Relation Extraction and the Influence of Automatic Named-Entity Recognition"; ACM Digital Library, vol. 5, No. 1, Article 2; Dec. 2007; 26 pages.

Hu et al.; "Matching Large Ontologies: A Divide-and-Conquer Approach"; Data & Knowledge Eng., vol. 67, Issue 1; Oct. 2008; pp. 140-160.

Janssens et al.; "A Hybrid Mapping of Information Science"; Scientometrics, vol. 75, No. 3; 2008; pp. 607-631.

Li et al.; "SEMINT: A Tool for Identifying Attribut Correspondences in Heterogeneous Databases Using Neural Networks"; Data and Knowledge Engineering 33 (2000); pp. 49-84.

Li et al.; "Web Services Provision: Solutions, Challenges, and Opportunities"; ACM Digital Library; Jan. 2009; pp. 80-87.

Malik et al.; "RATEWeb: Reputation Assessment for Trust Establishment Among Web Services"; ACM Digital Library; The VLDB Journal; 2009; pp. 885-911.

Myroshnichenko et al.; "Mapping ER Schemas to OWL Ontologies"; DIALOG/INSPEC/EI COMPENDEX; IEEE International Conference on Semantic Computing; Sep. 2009; pp. 324-329.

Pluempitiwiriyawej et al.; "Element Matching Across Data-Oriented XML Sources Using a Multi-Strategy Clustering Model"; Data & Knowledge Eng., vol. 48, Issue 3; 2004; pp. 297-333.

Qi Xiong et al.; "A Searchable Knowledge Map Based on Ontology"; INSPEC/IEEE; Fourth International Conference on Semantics, Knowledge and Grid; 2008; pp. 457-460.

Rousseeuw; "Silhouettes: A Graphical Aid to the Interpretation and Validation of Cluster Analysis"; J. of Computational and Applied Mathematics; 1987; pp. 53-65.

Smiljanic et al.; "Using Element Clustering to Increase the Efficiency of XML Schema Matching"; Data Engineering Workshops; 2006; Proc.; Apr. 24, 2006; pp. 1-10.

Storey, V. C.; "Comparing Relationships in Conceptual Modeling: Mapping to Semantic Classifications"; INSPEC/IEEE; IEEE Transactions on Knowledge and Data Engineering, vol. 17, No. 11; Nov. 2005; pp. 1478-1489.

* cited by examiner

QUERYING AND INTEGRATING STRUCTURED AND UNSTRUCTURED DATA

CROSS-REFERENCE TO RELATED APPLICATIONS

The present application is related to a U.S. application entitled "MAPPING OF RELATIONSHIP ENTITIES BETWEEN ONTOLOGIES," Ser. No. 12/780,663, filed May 14, 2010, assigned to the same assignee, and to a U.S. application entitled "PERFORMING MAPPINGS ACROSS MULTIPLE MODELS OR ONTOLOGIES," Ser. No. 12/909,264, filed Oct. 21, 2010, assigned to the same assignee. The entire contents of both applications are incorporated by reference herein.

BACKGROUND OF THE INVENTION

The present invention relates generally to methods and systems for information and data management. More particularly, the present invention relates to methods and systems for integrating and querying structured and unstructured data.

In many applications, it is becoming more critical to seamlessly access information from sources containing structured and unstructured data, e.g., text. Existing approaches for accessing both structured and unstructured data generally fall into one of two categories.

The first category involves the use of a common query interface, e.g., keyword query or structured query. However, each source type is queried separately, i.e., independent queries are performed for a structured data source and for an unstructured data source.

While most techniques in this category can perform an evaluation of a keyword query, the prevailing query interface for unstructured text, against structured data, a technique to access both structured and unstructured data using structured query (e.g. SPARQL) is outlined in for example, in Liu, et al., "Answering Structured Queries on Unstructured Data," WebDB, Jul. 23, 2007. The authors provide that structured queries are issued without any transformation against structured sources. According to Liu, after being first translated into keyword queries, the structured queries are also evaluated against unstructured data using standard information retrieval techniques.

Techniques in the first category provide a convenient integration at the user interface layer, i.e., a single querying paradigm is involved. However, these techniques only offer a shallow integration at the data layer; that is, no connections are established between related entities across structured and unstructured sources. As a result, a complete answer is unlikely to be retrieved where evidence or supporting data is spread among structured and unstructured sources.

The second category involves the use of information extraction techniques to extract structured data from unstructured data. Thus, the problem of seamlessly accessing both structured and unstructured data is reduced to accessing only structured data.

Techniques in the second category can address the shortcomings of the techniques in the first category if the information extraction phase is performed with respect to a well-known predefined schema. In other words, the information extraction phase would include an extraction of a set of predefined relationship types from textual data. Although mappings between the predefined schemas and other structured schemas can be performed with respect to such techniques, structured data that is generated from unstructured data remains disconnected from other available structured data if the information extraction phase does not provide for a restriction to a fixed set of relationship types.

SUMMARY OF THE INVENTION

According to an aspect of the present invention, a computer-implemented method is provided for querying and integrating structured and unstructured data. The method includes: receiving entity information that is extracted from a first set of unstructured data using an open domain information extraction system, wherein the entity information comprises relationship information between a first entity and a second entity of the first set of unstructured data; recognizing a pattern based on the relationship information and creating a schema for the first set of unstructured data based on the pattern; and associating an element of the created schema with (i) an entity of a second set of unstructured data or (ii) a schema element of an existing set of structured data if there is sufficient overall similarity between the created schema element and either the second unstructured data entity or the schema element of the existing structured data, thereby creating a link between the created schema element and either the second unstructured data entity or the schema element of the existing set of structured data.

According to another aspect of the present invention, a computer-implemented system is provided for querying and integrating structured and unstructured data. The system includes: a receiving device configured to receive entity information that is extracted from a first set of unstructured data using an open domain information extraction system, wherein the entity information comprises relationship information between a first entity and a second entity of the first set of unstructured data; a pattern recognition device configured to recognize a pattern based on the relationship information and to create a schema for the first set of unstructured data based on the pattern; and an element association device configured to associate an element of the created schema with (i) an entity of a second set of unstructured data or (ii) a schema element of an existing set of structured data if there is sufficient overall similarity between the created schema element and either the second unstructured data entity or the schema element of the existing structured data, thereby creating a link between the created schema element and either the second unstructured data entity or the schema element of the existing set of structured data.

According to still another aspect of the present invention, an article of manufacture tangibly embodies computer readable instructions which, when implemented, causes a computer to carry out the steps of the computer-implemented method of querying and integrating structured and unstructured data.

BRIEF DESCRIPTION OF THE DRAWINGS

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions. The following figures are included.

DETAILED DESCRIPTION OF THE PREFERRED EMBODIMENTS

It will be readily understood that the embodiments of the present invention, as generally described and illustrated in the figures herein, may be arranged and designed in a wide variety of different configurations in addition to the described presently preferred embodiments. Thus, the following detailed description of the embodiments of the present invention, as represented in the figures, is not intended to limit the scope of the invention, as claimed, but is merely representative of selected presently preferred embodiments of the invention. The following description is intended only by way of example, and simply illustrates certain selected presently preferred embodiments of the invention as claimed herein.

Figure 1:
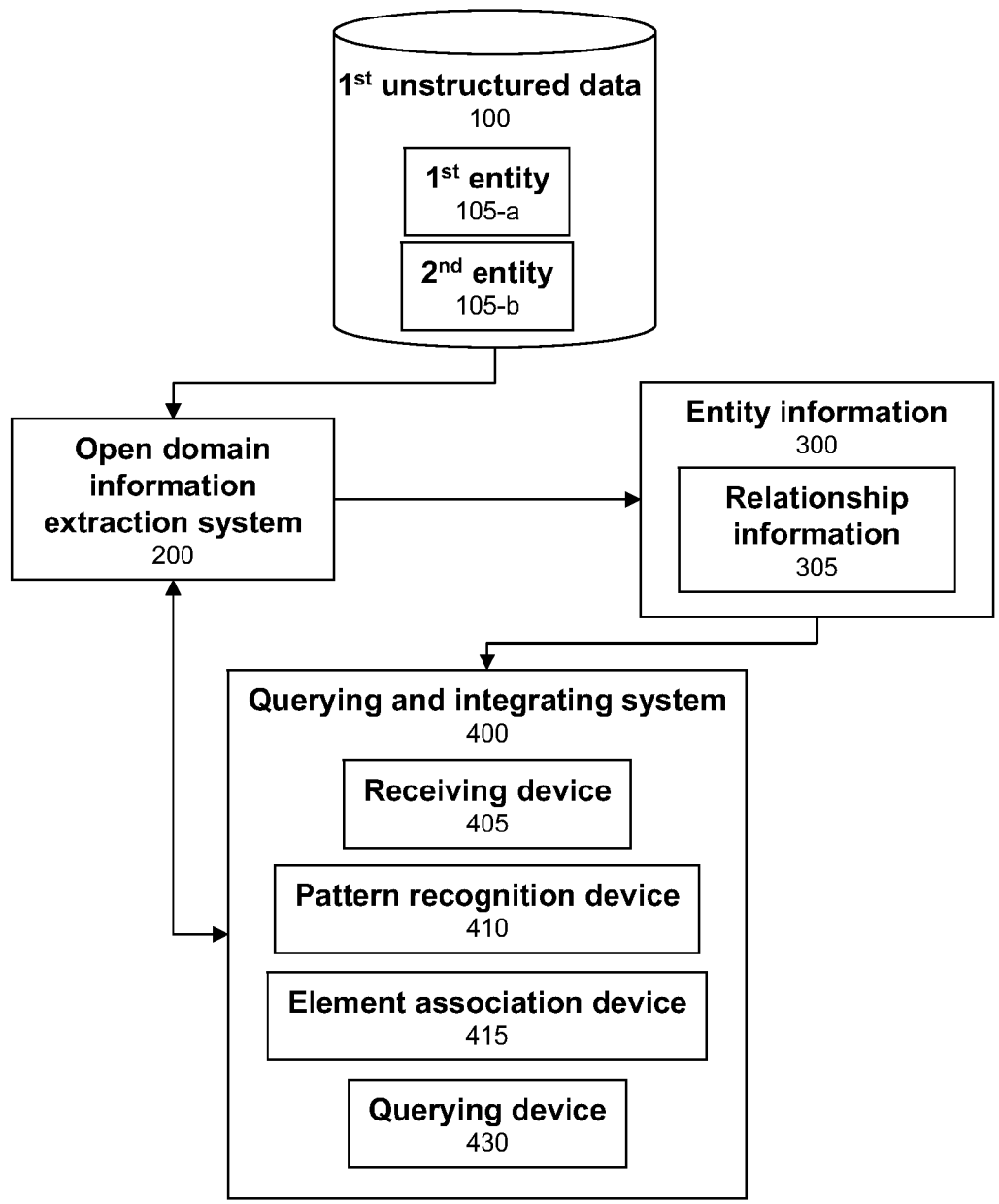
FIG. 1 is a block diagram that illustrates a computer-implemented system for querying and integrating structured and unstructured data where the system includes a receiving device, pattern recognition device and element association device according to an embodiment of the present invention.

Referring to FIG. 1, a block diagram illustrates a computer-implemented system 400 for querying and integrating structured and unstructured data according to an embodiment of the present invention. The system 400 includes: a receiving device 405, a pattern recognition device 410, an element association device 415, and a querying device 430.

The receiving device 405 is configured to receive entity information 300 that is extracted from a first set of unstructured data 100 using an open domain information extraction system 200. The entity information 300 includes relationship information 305 between a first entity 105-a and a second entity 105-b of the first set of unstructured data 100.

Figure 2:
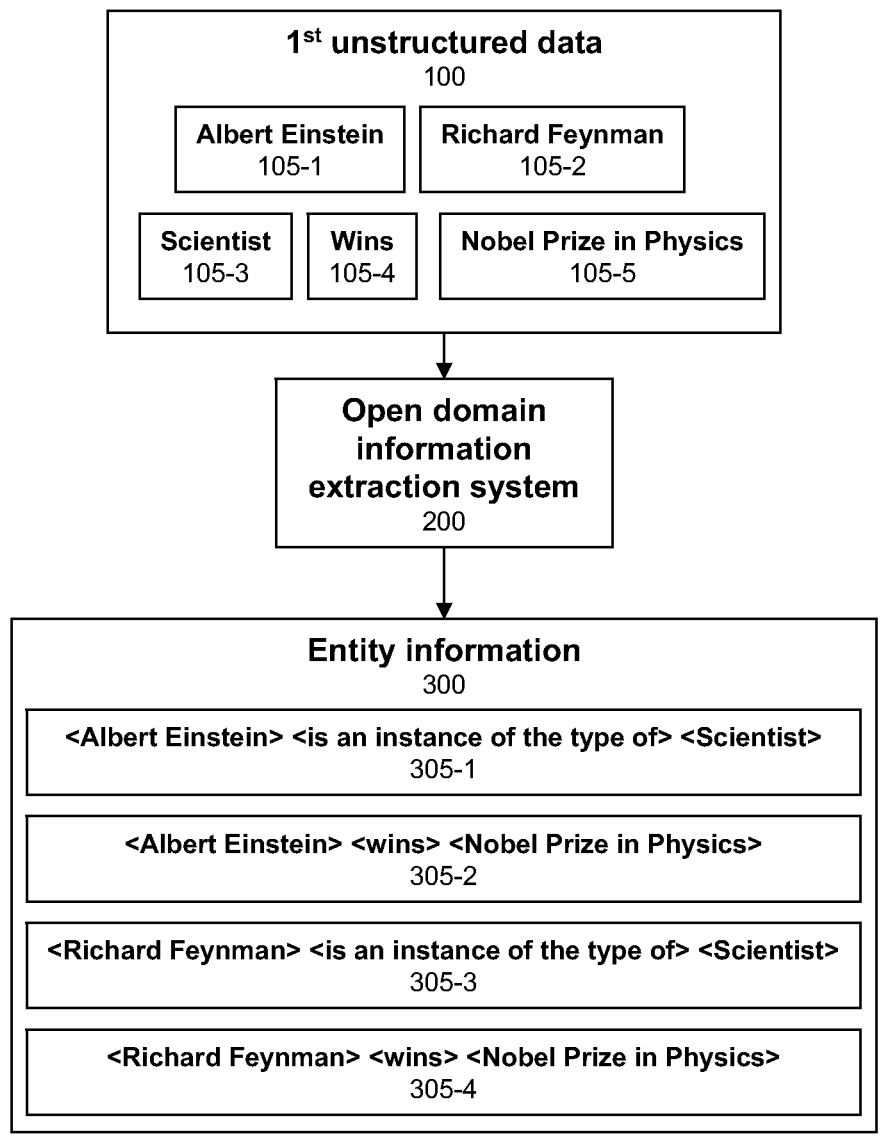
FIG. 2 is a block diagram that illustrates entity information that is extracted from a first set of unstructured data using an open domain information extraction system.

Referring to FIG. 2, a block diagram illustrates entity information 300 that is extracted from a first set of unstructured data 100 using the open domain information extraction system 200.

Unstructured data is data that does not have a predefined model (e.g., natural language text). Extracting unstructured data using an open domain information extraction system is an existing technique in the art. Open domain information extraction systems, such as TextRunner and Prismatic, are capable of providing extraction results without restricting the extraction process to a predefined set of relationship types. As such, embodiments of the present invention leverage the capability of the open domain information extraction systems to provide tighter data integration between structured and unstructured data.

In the example shown in FIG. 2, the first set of unstructured data 100 includes textual information about Albert Einstein 105-1, Richard Feynman 105-2, Scientist 105-3, and Nobel Prize in Physics 105-5. This first set of unstructured data 100 is inputted into the open domain information extraction system 200. The open domain information extraction system 200 analyzes and organizes the input and then outputs entity information 300, which identifies the entities and the relationships between the entities. Since the techniques of open domain information extraction systems are not new in the art, a description of how the system analyzes and organizes unstructured data will be omitted. In FIG. 2, an example entity information output is: <Albert Einstein> <is an instance of the type of> <Scientist> (see block 305-1). In this example, <Albert Einstein> and <Scientist> are entities and <is an instance of the type of > is the relationship between the two identified entities.

Referring back to FIG. 1, the pattern recognition device 410 is configured to recognize a pattern based on the relationship information 305 and to create a schema for the first set of unstructured data 100 based on the recognized pattern.

Figure 3A:
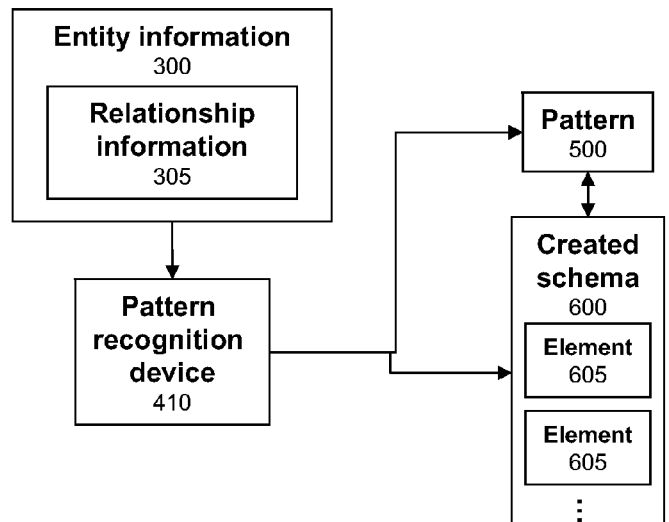
FIG. 3A is a block diagram that illustrates how the pattern recognition device creates a schema based on a recognized pattern according to an embodiment of the present invention.

Referring to FIG. 3A, a block diagram illustrates how the pattern recognition device 410 creates a schema 600 based on a recognized pattern 500 according to an embodiment of the present invention. The pattern recognition device 410 receives as input, entity information 300 which includes relationship information 305, to create a pattern 500 that is based on the relationship information 305. The pattern recognition device 410 then uses the pattern 500 to create a schema 600 that contains one or more elements 605.

Figure 3B:
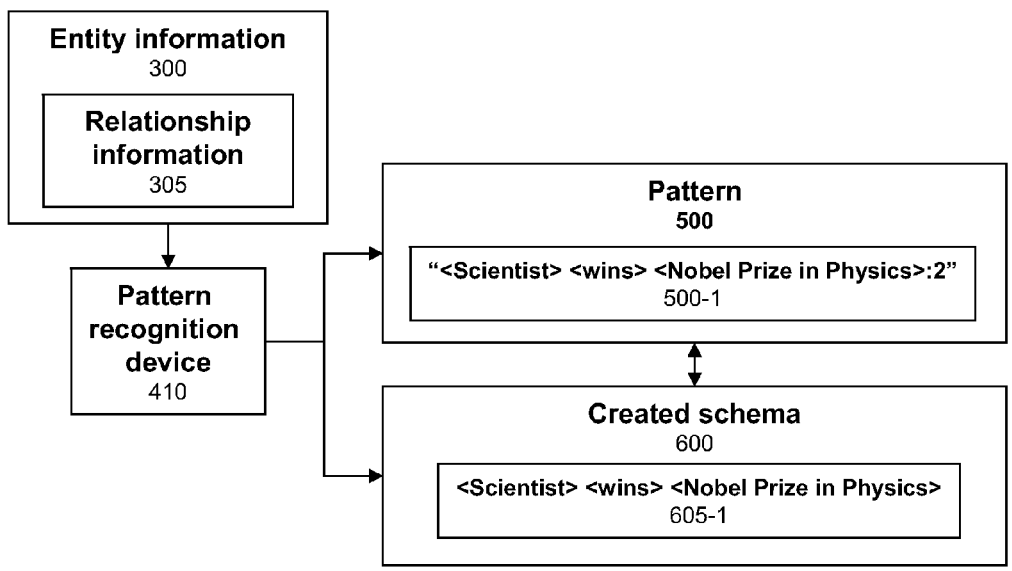
FIG. 3B is a block diagram that illustrates an example of how the pattern recognition device creates a schema based on a recognized pattern according to an embodiment of the present invention.

Based on the example shown in FIG. 2, referring to FIG. 3B, an example pattern 500 could be "a scientist wins the novel prize in physics" (block 500-1). The example schema 600 for this pattern could be "<Scientist> <wins> <Nobel Prize in Physics>" (block 605-1). In this scenario, there are two situations that fall into pattern 500, specifically <Albert Einstein> <wins> <Nobel Prize in Physics> (block 305-2) and <Richard Feynman> <wins> <Nobel Prize in Physics> (block 305-4).

The linked and integrated global schema is used to assist users in the formulation of queries spanning multiples data sources. This is particularly important when users are not very familiar with information available in the available structured and unstructured data sources. In addition, inter-schema links establishes connections between various data sources at the schema level and helps to identify potential candidate links at the instance level. The linked and integrated global schema is used at query time to focus the search of instance level links, which makes the discovery of links between instance data in different sources more scalable.

Figure 4A:
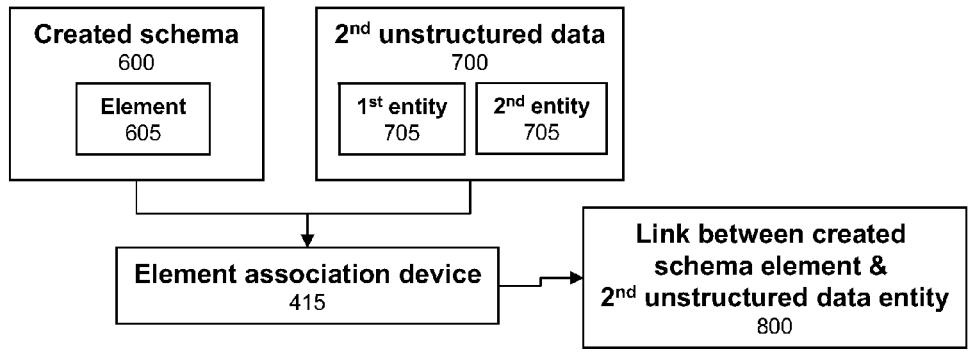
FIG. 4A is a block diagram that illustrates how the element association device associates an element of the created schema with an entity of a second set of unstructured data to create a link between the created schema element and the second unstructured data entity according to an embodiment of the present invention.

Referring to FIG. 4A, the element association device 415 is configured to associate an element 605 of the created schema 600 with (i) an entity 705 of a second set of unstructured data 700 or (ii) a schema element of an existing set of structured data (not shown). In FIG. 4A, only the second set of unstructured data is illustrated for example purposes. As a result of the association, a link 800 is created between the created schema 600 and the second unstructured data entity 800.

Figure 4B:
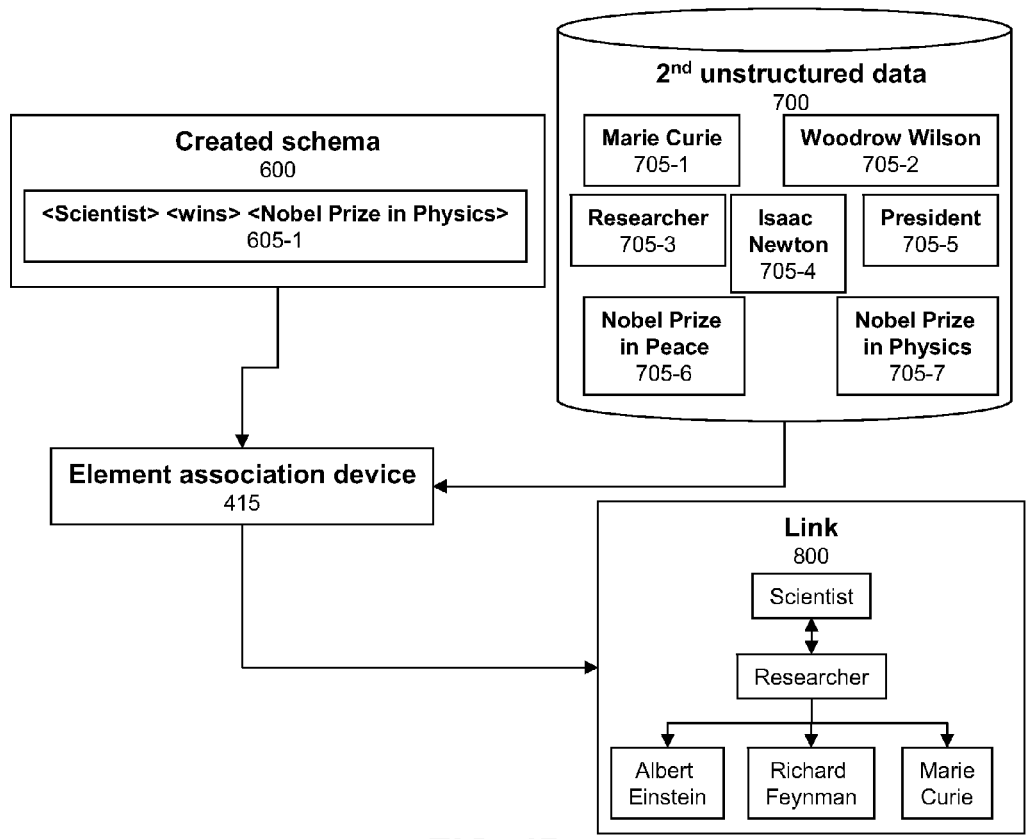
FIG. 4B is a block diagram that illustrates an example of how the element association device associates an element of the created schema with an entity of a second set of unstructured data to create a link between the created schema element and the second unstructured data entity according to an embodiment of the present invention.

FIG. 4B illustrates an example of how the element association device 415 associates an element 605-1 of the created schema 600 with an entity 705-1, 705-2, 705-3, 705-4, 705-5, 705-6, 705-7 of the second set of unstructured data 700 to create the link 800 between the created schema element 605-1 and the second unstructured data entity 705-1, 705-2, 705-3, 705-4, 705-5, 705-6, 705-7 according to an embodiment of the present invention.

The element association device 415 performs the association if there is sufficient overall similarity between the created schema element and either the second unstructured data entity or the schema element of the existing structured data. If there is a successful association, a link is created between the created schema element and either the second unstructured data entity or the schema element of the existing set of structured data. The example link 800 shown in FIG. 4B illustrates three elements "Albert Einstein," "Richard Feynman," and "Marie Curie." These elements are deemed to be instances of the type "Researcher," which is deemed to be an instance of the type "Scientist." Instance level searching may be performed at query evaluation time and may be performed by the querying device 430.

Figure 4C:
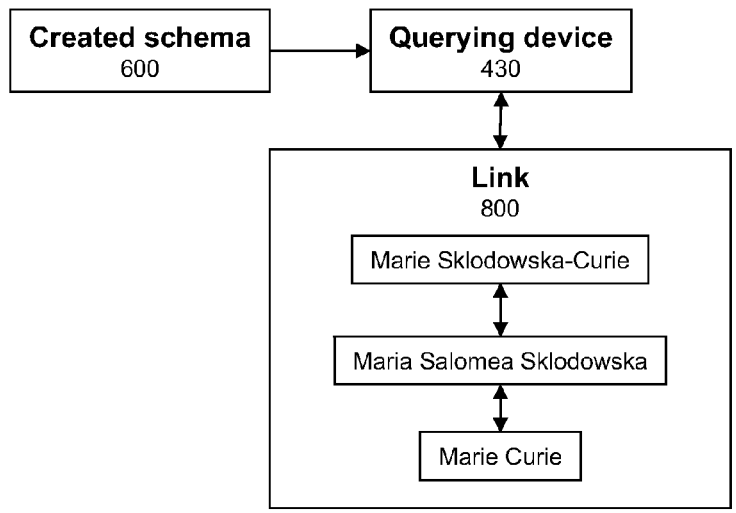
FIG. 4C is a block diagram that illustrates an example of instance level links according to an embodiment of the present invention.

An instance level search for all "Researchers" would return "Albert Einstein," "Richard Feynman," and "Marie Curie," although only Curie is explicitly known in the unstructured data to be a "Researcher" (Einstein and Feynman are explicitly known to be "Scientists"). Another example of an instance level search would be to recognize that "Maria Salomea Sklodowska" and "Marie Sklodowska-Curie" should also be returned as answers and to indicate that "Maria Salomea Sklodowska," "Marie Sklodowska-Curie," and "Marie Curie" are indeed the same person. Referring to FIG. 4C, the following example instance level links are shown: "Marie Sklodowska-Curie" <-> "Maria Salomea Sklodowska" <-> "Marie Curie".

The techniques of discovering connections and similarities between types (e.g equivalence between "Researcher" and "Scientist"), according to the embodiment of the present invention, narrows down the candidates for instance level links. For example, an instance level link between "Maria Salomea Sklodowska" and "Marie Curie" may be established because of a high lexical and type similarity. However, an instance level link would not be established as between "Marie Curie High School" and "Marie Curie" because the similarity between their known types (i.e., "High School" and "Scientist") is relatively low even though there is some lexical similarity between the two instances.

Figure 4D:
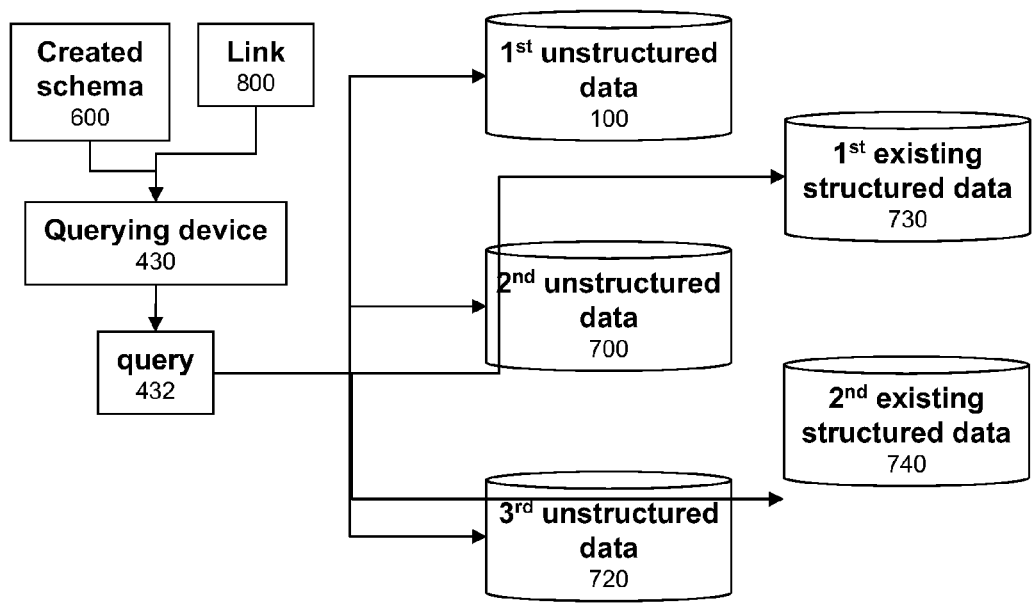
FIG. 4D is a block diagram that illustrates a query that is formulated by the querying device according to an embodiment of the present invention.

Referring to FIG. 4D, a block diagram illustrates a query 432 that is formulated by the querying device 430. The query 432 may be sent to one or more of the following databases: the first set of unstructured data 100, the second set of unstructured data 700, a third set of unstructured data 720, the existing set of structured data 730 ("$1^{st}$ existing structured data" in the figure), and another existing set of structured data 740 ("$2^{nd}$ existing structure data" in the figure).

In the examples shown in FIG. 4C and FIG. 4D, the querying device 430 receives as input, the created schema 600 and the created link 800.

Figure 5:
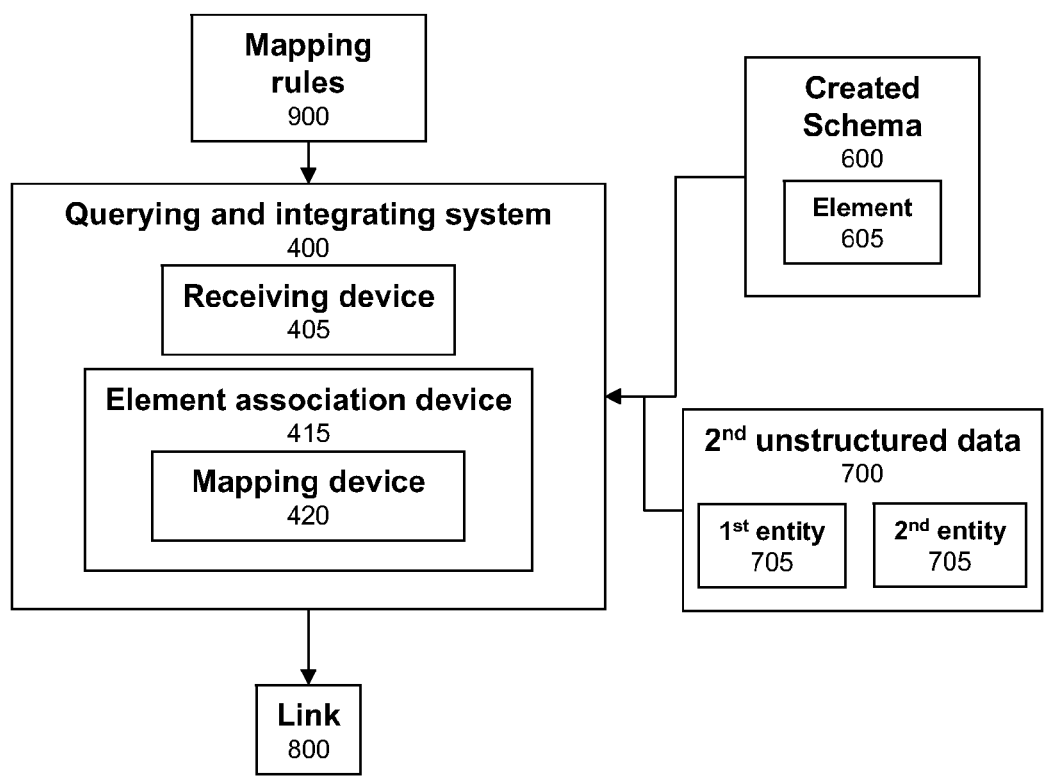
FIG. 5 is a block diagram that illustrates receiving mapping rules by the receiving device and a mapping device that is part of the element association device according to an embodiment of the present invention.

Referring to FIG. 5, a block diagram illustrates receiving a set of mapping rules 900 by the receiving device 405 and a mapping device 420 that is part of the element association device 415 according to an embodiment of the present invention. The mapping device 420 is configured to map the created schema element 605 to either the second unstructured data entity 705 or the schema element of an existing set of structured data (not shown) based on the set of mapping rules 900. As a result of the mapping, the link 800 is created. Existing mapping techniques can be used to map the created schema element 605 to the second unstructured data entity 705 or the schema element of an existing set of structured data.

Figure 6:
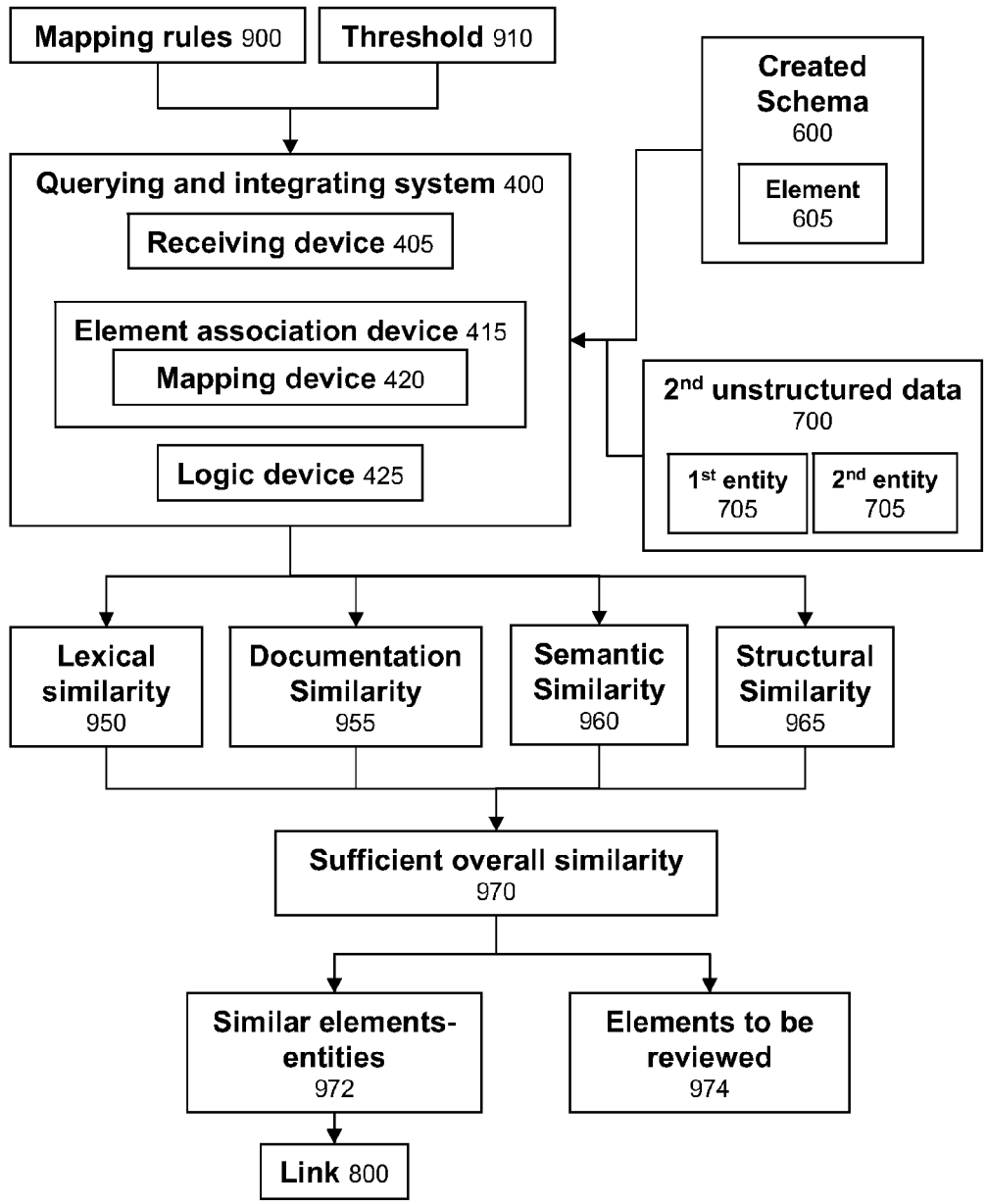
FIG. 6 is a block diagram that illustrates a threshold value that is received by the receiving device and certain similarity values that are measured and analyzed by the mapping device to create a link between similar elements-entities and a cluster of elements to be reviewed according to an embodiment of the present invention.

Referring to FIG. 6, a block diagram illustrates a threshold value 910 that is also received by the receiving device 405 according to an embodiment of the present invention. Certain "similarity values" 950, 955, 960, 965 are measured and analyzed by the mapping device 420 to create a link 800 between similar elements-entities 972 and a cluster of elements to be reviewed 974. These similarity values include lexical similarity 950, documentation similarity 955, semantic similarity 960, and structural similarity 965.

Lexical similarity 950 is a measure of the similarity between names of two schema elements to compare. Standard text-based similarity metrics such as edit-distance or Jaccard similarity on n-grams can be used for this purpose.

Documentation similarity 955 is a measure of the similarity between the documentation of two schema elements to compare. Standard information retrieval cosine measure on tf-idf term vectors is used for this purpose.

When a hierarchical organization of terms (e.g. Wordnet) is available, semantic similarity 960 between two terms can be computed as a measure of how close to each other they are in the hierarchy.

Structural similarity 965 measures the relative similarity between the internal structure of two schema elements to compare.

The similarity values 950, 955, 960, 965 are compared with the threshold value 910 to determine if there is sufficient overall similarity 970. The threshold value can initially be specified as input of the mapping module, and can be automatically adjusted overtime as the system learned from user feedback what is the optimal threshold in a particular domain.

If there is sufficient overall similarity 970, the created schema element 605 and either the second unstructured data entity (705) or the schema element of the existing set of structured data (not shown) are combined into a group 972 of similar elements or element-entity combination. However, if there is insufficient overall similarity, the created schema element 605 and either the second unstructured data entity (705) or the schema element of the existing set of structured data (not shown) are clustered into a group that requires further review. Further review may involve user feedback to assess why the group of elements or an element-entity combination does not have sufficient similarity.

Figure 7:
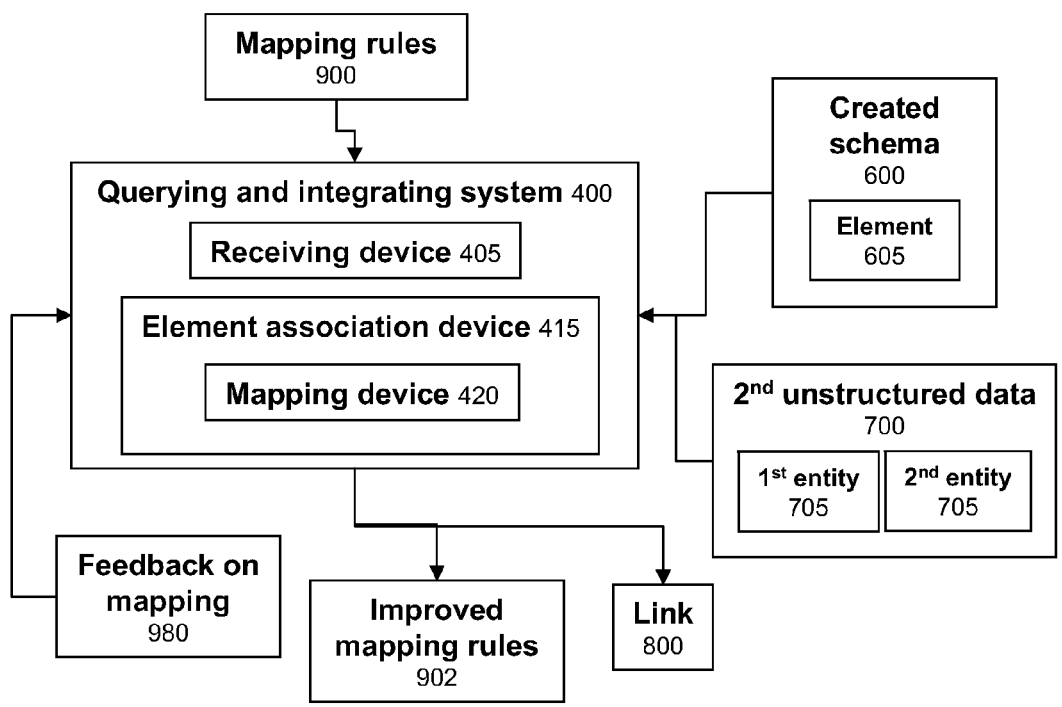
FIG. 7 is a block diagram that illustrates feedback that is received by the receiving device and incorporated by the mapping device to produce an improved set of mapping rules according to an embodiment of the present invention.

Referring to FIG. 7, a block diagram illustrates feedback 980 that is received by the receiving device 405 and incorporated by the mapping device 420 to produce an improved set of mapping rules 902 according to an embodiment of the present invention. Mappings can be improved by incorporating user feedback by using a learning algorithm, e.g., logistic regression. The learning algorithm figures out the optimal weighting of the different similarity measures based of user feedback. User feedback is obtained when the user explicitly reject or accept a mapping produced by the system.

Figure 8:
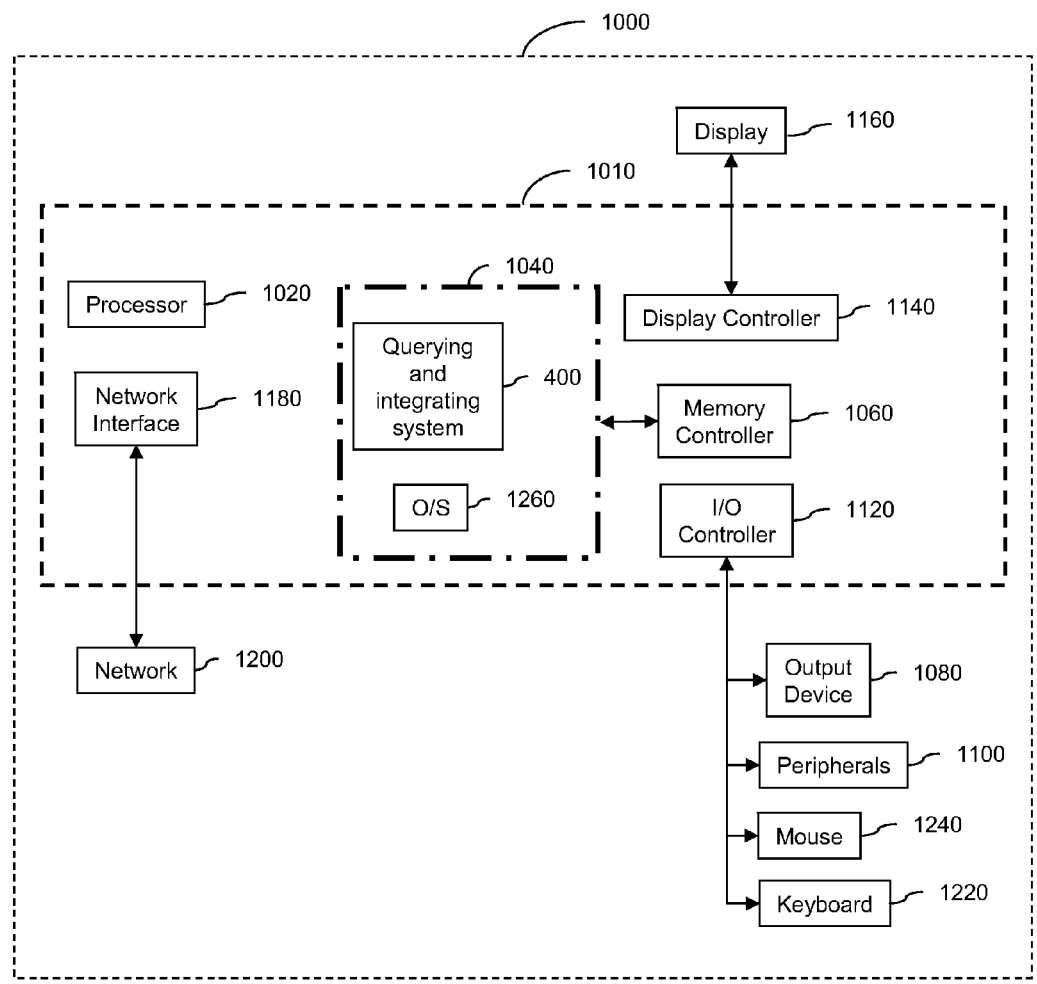
FIG. 8 is a block diagram that illustrates a computer-implemented system that includes the system for querying and integrating structured and unstructured data according to an embodiment of the present invention.

Referring to FIG. 8, a block diagram illustrates a computer-implemented system 1000 includes the system for querying and integrating structured and unstructured data 400 according to an embodiment of the present invention.

As can be appreciated, the computing system 1000 may include a computing device, including but not limited to, a desktop computer, a laptop, a server, a portable handheld device, or any other electronic device. For ease of the discussion, an embodiment of the invention will be discussed in the context of the computer 1010.

The computer 1010 is shown to include a processor 1020, memory 1040 coupled to a memory controller 1060, one or more input and/or output (I/O) devices, peripherals 1080, 1100 that are communicatively coupled via a local input/output controller 1120, and a display controller 1180 coupled to a display 1160. In an exemplary embodiment, the system 1000 can further include a network interface 1140 for coupling to a network 1200. The network 1200 transmits and receives data between the computer 1010 and external systems. In an exemplary embodiment, a conventional keyboard 1220 and mouse 1240 can be coupled to the input/output controller 1200.

In various embodiments, the memory 1040 stores instructions that can be executed by the processor 1020. The instructions stored in memory 1040 may include one or more separate programs, each of which comprises an ordered listing of executable instructions for implementing logical functions. In the example of FIG. 8, the instructions stored in the memory 1040 include at least a suitable operating system (OS) 1260 and querying and integrating system 400. The operating system 1260 essentially controls the execution of other computer programs and provides scheduling, input-output control, file and data management, memory management, and communication control and related services.

When the computer 1010 is in operation, the processor 1020 is configured to execute the instructions stored within the memory 1040, to communicate data to and from the memory 1040, and to generally control operations of the computer 1010 pursuant to the instructions. The processor 1020 can be any custom made or commercially available processor, a central processing unit (CPU), an auxiliary processor among several processors associated with the computer 1010, a semiconductor based microprocessor (in the form of a microchip or chip set), a macroprocessor, or generally any device for executing instructions.

The processor 1020 executes the instructions of the querying and integrating system 400 according to embodiments of the present invention. In various embodiments, the querying and integrating system 400 of the present invention is stored in the memory 1040 (as shown), is executed from a portable storage device (e.g., CD-ROM, Diskette, FlashDrive, etc.) (not shown), and/or is run from a remote location such as from a central server (not shown). The querying and integrating system 400 may be a software application that carries out a process such as described below with reference to FIG. 9. In some embodiments of the present invention, memory 1040 also stores data, such as unstructured and structured data.

Figure 9:
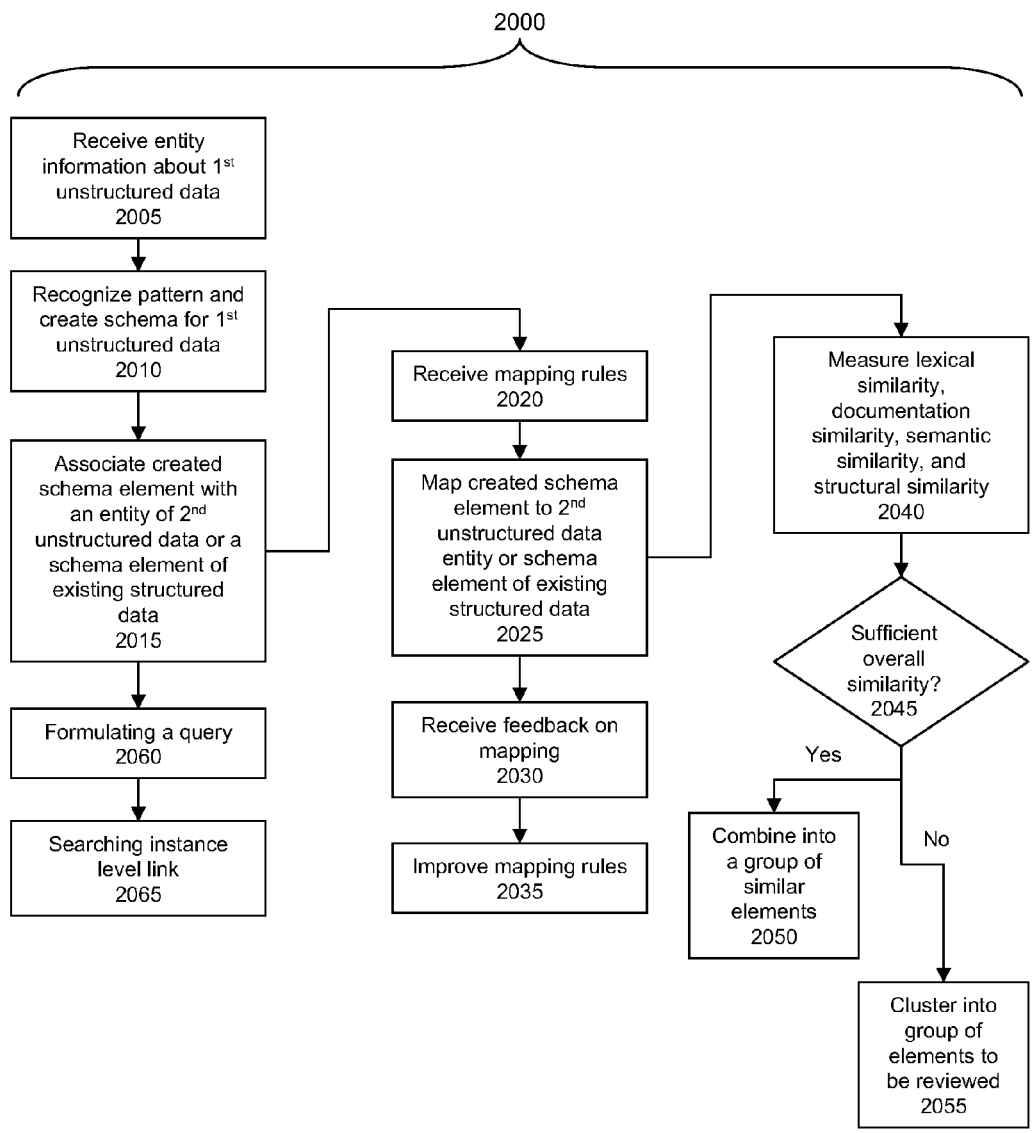
FIG. 9 is a flow chart that illustrates a computer-implemented method of querying and integrating structured and unstructured data according to an embodiment of the present invention.

Referring to FIG. 9, a flow chart illustrates a computer-implemented method 2000 of querying and integrating structured and unstructured data according to an embodiment of the present invention.

At step 2005, the method carries out the step of receiving entity information that is extracted from a first set of unstructured data using an open domain information extraction system. As explained above with respect to another embodiment of the present invention, the entity information includes relationship information between a first entity and a second entity of the first set of unstructured data.

At step 2010, the method carries out the step of recognizing a pattern based on the relationship information and creates a schema for the first set of unstructured data based on the pattern.

At step 2015, the method carries out the step of associating an element of the created schema with (i) an entity of a second set of unstructured data or (ii) a schema element of an existing set of structured data if there is sufficient overall similarity between the created schema element and either the second unstructured data entity or the schema element of the existing structured data, thereby creating a link between the created schema element and either the second unstructured data entity or the schema element of the existing set of structured data.

The associating step 2015 may include the steps of receiving a set of mapping rules (2020), and mapping the created schema element to (i) the second unstructured data entity or (ii) the schema element of the existing set of structured data based on the set of mapping rules to create the link (2025).

The mapping step (2025) may include the step of measuring lexical similarity, documentation similarity, semantic similarity, and structural similarity between the created schema element and (i) the second unstructured data entity or (ii) the schema element of the existing set of structured data to determine if there is sufficient overall similarity based on a given threshold value (2040).

If there is sufficient overall similarity, the method will carry out the step of combining the created schema element and either the second unstructured data entity or the schema element of the existing set of structured data into a group of similar elements or element-entity combination, thereby creating the link (2050).

If there is insufficient overall similarity, the method will carry out the step of clustering the created schema element and either the second unstructured data entity or the schema element of the existing set of structured data into a group to be reviewed (2055).

The measuring (2040), combining (2050), and clustering (2055) steps are based on the received mapping rules.

The associating step (2015) may further include the steps of receiving feedback on the results of the mapping (2030) and improving the step of mapping rules based on the feedback to produce an improved step of mapping rules (2035).

The method 2000 may further include the step of formulating a query to be sent to one or more databases 2060, which may include the first set of unstructured data, the second set of unstructured data, a third set of unstructured data, the existing set of structured data, and/or another existing set of structured data.

The method 2000 may still further include the step of searching an instance level link at query evaluation time 2065.

As will be appreciated by one skilled in the art, aspects of the present invention may be embodied as a system (as described above), method or as a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 10:
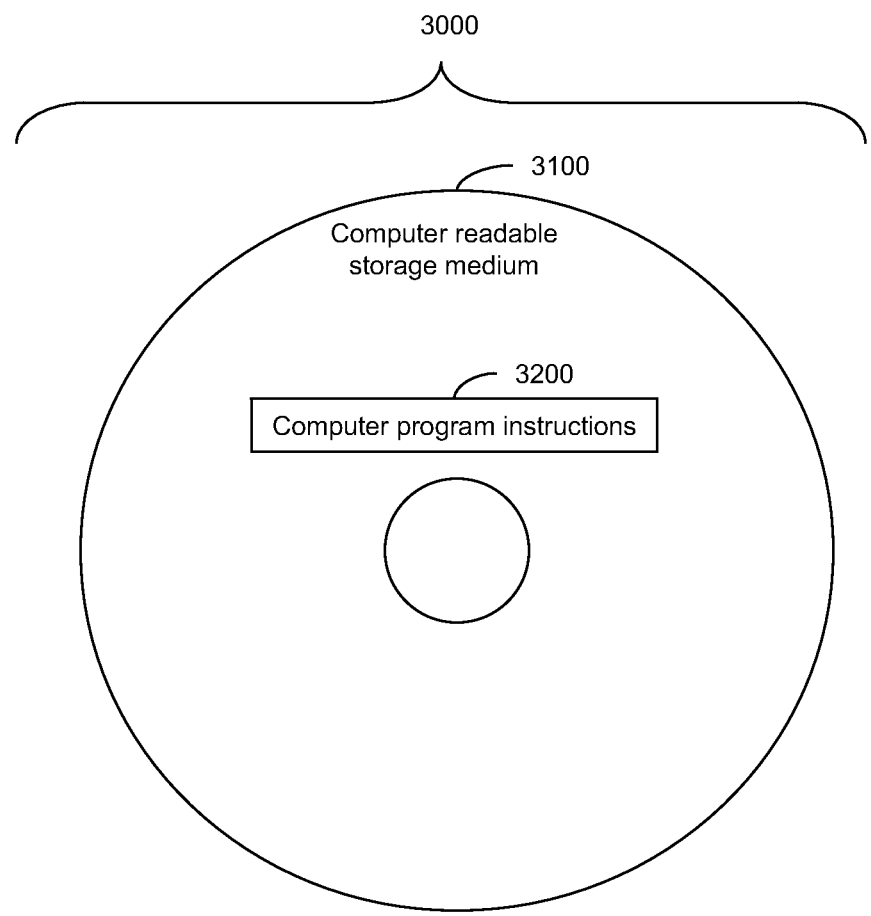
FIG. 10 is an illustration of a computer program product for carrying out the steps of the methods according to an embodiment of the present invention.

FIG. 10 shows a computer program product 3000 for carrying out the steps of the method 2000 according to embodiments of the present invention. The computer program product 3000 includes computer program instructions 3200 for carrying out the steps of these methods as discussed above. As shown, computer program instructions 3200 are stored on a computer readable storage medium 3100, as discussed below.

A combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A computer-implemented method of querying and integrating structured and unstructured data, the method comprising:

receiving entity information that is extracted from a first set of unstructured data using an open domain information extraction system, wherein the entity information comprises relationship information between first entities and second entities of the first set of unstructured data, and the relationship information stores semantics of verbs connecting the first entities and the second entities;

recognizing a pattern based on the relationship information by identifying repeated occasions of a first entity, a second entity and a verb connecting the first entity and the second entity in the first set of unstructured data;

creating a schema for the first set of unstructured data based on the pattern, wherein the schema comprises the first entity, the second entity and the verb as elements; and associating an element of the created schema with (i) an entity of a second set of unstructured data or (ii) a schema element of an existing set of structured data if there is sufficient overall similarity between the created schema element and either the second unstructured data entity or the schema element of the existing structured data, thereby creating a link between the created schema element and either the second unstructured data entity or the schema element of the existing set of structured data.

2. The method according to claim 1, wherein the associating step comprises:
receiving a set of mapping rules; and
mapping the created schema element to (i) the second unstructured data entity or (ii) the schema element of the existing set of structured data based on the set of mapping rules to create the link.

3. The method according to claim 2, wherein the mapping step comprises:
measuring lexical similarity, documentation similarity, semantic similarity, and structural similarity between the created schema element and (i) the second unstructured data entity or (ii) the schema element of the existing set of structured data to determine if there is said sufficient overall similarity based on a given threshold value;
combining the created schema element and either the second unstructured data entity or the schema element of the existing set of structured data into a group of similar elements or element-entity combination, thereby creating the link, if there is said sufficient overall similarity; and
clustering the created schema element and either the second unstructured data entity or the schema element of the existing set of structured data into a group to be reviewed, if there is insufficient overall similarity,
wherein the measuring, combining, and clustering steps are based on the mapping rules.

4. The method according to claim 2, wherein the associating step further comprises:
receiving feedback on results of the mapping; and
improving the set of mapping rules based on the feedback to produce an improved set of mapping rules.

5. The method according to claim 1, further comprising formulating a query to be sent to a database that is selected from the group consisting of:
the first set of unstructured data,
the second set of unstructured data,
a third set of unstructured data,
the existing set of structured data, and
another existing set of structured data.

6. The method according to claim 1, further comprising searching an instance level link at query evaluation time.

7. A computer-implemented system for querying and integrating structured and unstructured data, system comprising:
A receiving device configured to receive entity information that is extracted from a first set of unstructured data using an open domain information extraction system, wherein the entity information comprises relationship information between a first entities and a second entities of the first set of unstructured data, and the relationship information stores semantics of verbs connecting the first entities and the second entities;
A pattern recognition device configured to recognize a pattern based on the relationship information by identifying repeated occasions of a first entity, a second entity and a verb connecting the first entity and the second in the first set of unstructured data;
creating a schema for the first set of unstructured data based on the pattern, wherein the schema comprises the first entity, the second entity and the verb as elements; and
an element association device configured to associate an element of the created schema with (i) an entity of a second set of unstructured data or (ii) a schema element of an existing set of structured data if there is sufficient overall similarity between the created schema element and either the second unstructured data entity or the schema element of the existing structured data, thereby creating a link between the created schema element and either the second unstructured data entity or the schema element of the existing set of structured data.

8. The computer-implemented system according to claim 7, wherein: the receiving device is further configured to receive a set of mapping rules; and the element association device comprises a mapping device configured to map the created schema element to (i) the second unstructured data entity or (ii) the schema element of the existing set of structured data based on the set of mapping rules to create the link.

9. The computer-implemented system according to claim 8, wherein:
the receiving device is further configured to receive a threshold value for determining overall similarity between schema elements; and
the mapping device, based on the mapping rules, is further configured to:
measure lexical similarity, documentation similarity, semantic similarity, and structural similarity between the created schema element and (i) the second unstructured data entity or (ii) the schema element of the existing set of structured data to determine if there is said sufficient overall similarity based on the threshold value;
combine the created schema element and either the second unstructured data entity or the schema element of the existing set of structured data into a group of similar elements or element-entity combination, thereby creating the link, if there is said sufficient overall similarity; and
cluster the created schema and either the second unstructured data entity or the schema element of the existing set of structured data into a group to be reviewed, if there is insufficient overall similarity.

10. The computer-implemented system according to claim 7, further comprising a querying device configured to formulate a query to be sent to a database that is selected from the group consisting of:
the first set of unstructured data,
the second set of unstructured data,
a third set of unstructured data,
the existing set of structured data, and
another existing set of structured data.

11. The computer-implemented system according to claim 10, wherein the querying device is further configured to search instance level links at query evaluation time.

12. The computer-implemented system according to claim 9, wherein the mapping device comprises a logic device configured to determine if there is said sufficient overall similarity or said insufficient overall similarity between the created schema element and either the second unstructured data entity or the schema element of the existing set of structured data.

13. The computer-implemented system according to claim 8, wherein
the receiving device is further configured to receive feedback on the results of the mapping; and
the mapping device is further configured to incorporate the feedback on the mapping into the set of mapping rules and to produce an improved set of mapping rules.

14. A computer program product for querying and integrating structured and unstructured data, the computer program product comprising:
receiving entity information that is extracted from a first set of unstructured data using an open domain information extraction system, wherein the entity information comprises relationship information between a first entities and a second entities of the first set of unstructured data, and the relationship information stores semantics of verbs connecting the first entities and the second entities;

recognizing a pattern based on the relationship information by identifying repeated occasions of a first entity, a second entity and a verb connecting the first entity and the second entity in the first set of unstructured data;

creating a schema for the first set of unstructured data based on the pattern, wherein the schema comprises the first entity, the second entity and the verb as elements; and associating an element of the created schema with (i) an entity of a second set of unstructured data or (ii) a schema element of an existing set of structured data if there is sufficient overall similarity between the created schema element and either the second unstructured data entity or the schema element of the existing structured data, thereby creating a link between the created schema element and either the second unstructured data entity or the schema element of the existing set of structured data.

15. The computer program product according to claim 14, wherein the associating step comprises:
    receiving a set of mapping rules; and
    mapping the created schema element to (i) the second unstructured data entity or (ii) the schema element of the existing set of structured data based on the set of mapping rules to create the link.

16. The computer program product according to claim 15, wherein the mapping step comprises:
    measuring lexical similarity, documentation similarity, semantic similarity, and structural similarity between the created schema element and (i) the second unstructured data entity or (ii) the schema element of the existing set of structured data to determine if there is said sufficient overall similarity based on a given threshold value;
    combining the created schema element and either the second unstructured data entity or the schema element of the existing set of structured data into a group of similar elements or element-entity combination, if there is said sufficient overall similarity; and
    clustering the created schema element and either the second unstructured data entity or the schema element of the existing set of structured data into a group to be reviewed, if there is insufficient overall similarity.

17. The computer program product according to claim 15, wherein the associating step further comprises:
    receiving feedback on results of the mapping; and
    improving the set of mapping rules based on the feedback to produce an improved set of mapping rules.

18. The computer program product according to claim 14, wherein the method further comprises formulating a query to be sent to a database that is selected from the group consisting of:
    the first set of unstructured data,
    the second set of unstructured data,
    a third set of unstructured data,
    the existing set of structured data, and
    another existing set of structured data.

19. The computer program according to claim 14, wherein the method further comprises searching instance level links at query evaluation time.

* * * * *